Nov. 25, 1952 — R. M. WILSON — 2,619,316
CHECK VALVE
Filed Feb. 4, 1947
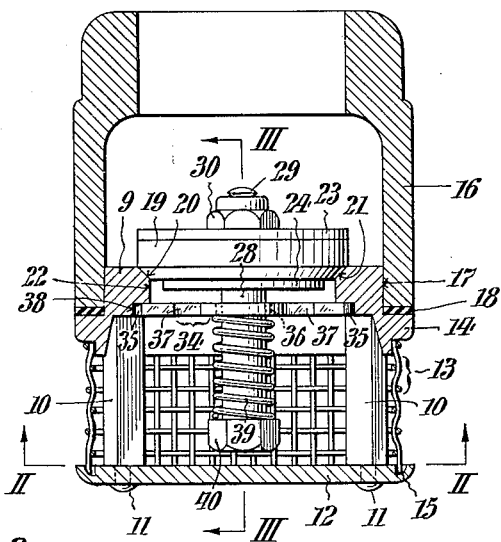
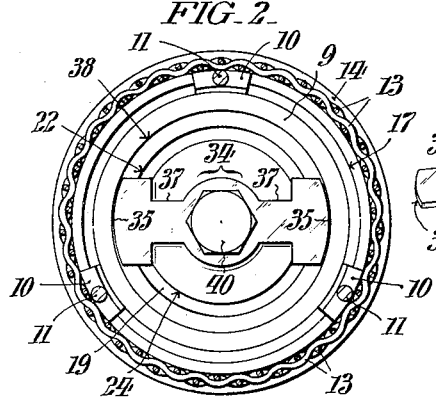
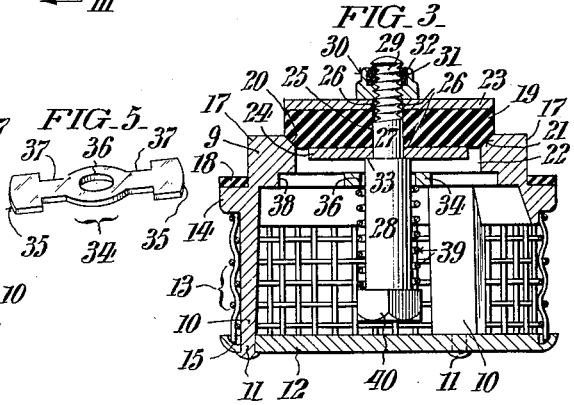
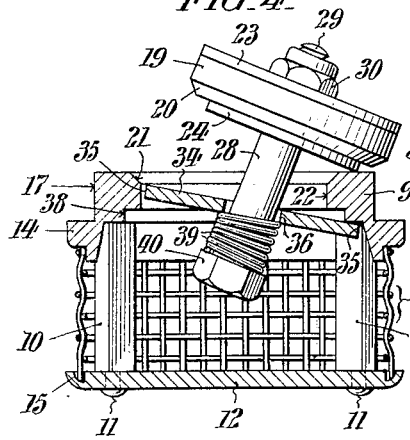
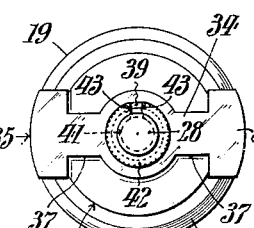
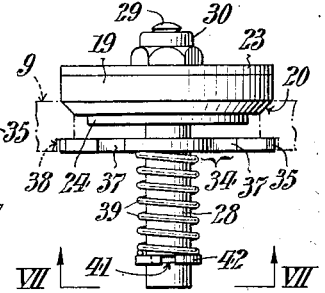
INVENTOR:
Ronald M. Wilson,
BY Paul & Paul
ATTORNEYS.

Patented Nov. 25, 1952

2,619,316

UNITED STATES PATENT OFFICE 2,619,316

CHECK VALVE

Ronald M. Wilson, Ambler, Pa.

Application February 4, 1947, Serial No. 726,286

4 Claims. (Cl. 251—127)

1

This invention has general reference to valves of the species adapted for opening under pressure, to permit passage therethrough of a gaseous or liquid fluid, and more commonly known as "check-valves"; while it relates to a greater extent to the type of such valves for use in the suction lines of gasoline pumps, compressor decks or heads, and other locations where lightness in weight and sensitivity of action are pre-requisite factors.

The primary object of this invention is to provide a simple and compact check-valve in which the valve assembly, per se, can be removed from, or placed in, normal position relative to the associated seating structure with facility and minimum effort, as well as with positive assurance that it will operate as desired.

Another object is to provide a check-valve of the species indicated in the preceding paragraph which offers a minimum of impedance to the free flow of fluid therethrough.

A further object is to provide a check-valve of the type indicated above which includes a minimum of parts that, by virtue of their structural form and assembly, positively ensure the valve against developing irregularities that conduce to interfere with the desirable flow of fluid passing through the same.

In the drawings:

Fig. 1 is a vertical section through a check-valve conveniently embodying this invention.

Fig. 2 is a horizontal section through the valve taken approximately as indicated by the angled arrows II—II in Fig. 1.

Fig. 3 is an axial section taken as indicated by the angled-arrows III—III in Fig. 1.

Fig. 4 is a view similar to Fig. 1 with the upper casing component removed and illustrating how the valve assembly may be readily tilted for removal and/or replacement.

Fig. 5 is a perspective view of a cross-piece or retainer member, hereinafter fully described.

Fig. 6 is an elevation of a modified form of the valve assembly.

Fig. 7 is a plan view of the same taken approximately as indicated by the angled-arrows VII—VII in Fig. 6; and, Fig. 8 is a perspective view of a retainer collar or grip-washer involved in the form of this invention shown in Figs. 6 and 7.

Referring now, more in detail, to the drawings the reference character 9 designates an annular seat member which has three circumferentially-spaced pendent arcuate-section legs 10 having pin extensions 11 affording rivet attachment for

2 a screen retainer 12. The screen 13 is of suitable perforate or reticulate material arranged to engage between a shoulder 14 of the seat member 9 and a groove 15 in the inner face of the retainer 12. The numeral 16, Fig. 1, indicates a cover component or a foot-valve body, the same having a friction fit on an upper reduction 17 of the seat member 9 with interposition of a sealing-gasket 18.

The valve assembly, per se, comprises a centrally bored member 19 of hard-rubber, or other suitable material, said member being beveled at 20 for seating coaction with a complemental bevel 21 around the bore of the seat member 17, and being interposed between outer and inner metallic reinforcing discs 23, 24 respectively. Extending through the bore, 25, Fig. 3 of the valve-member 19 and corresponding holes 26 in the discs 23, 24 is the diametrically reduced extension 27 of a headed-stud or stem 28, said extension being screw-threaded for a portion of its length, at 29, for engagement by a clamp-nut 30 having a concentric counter bore 31 to receive suitable material 32 whereby the parts aforesaid are securely locked together against relative rotation, or disengagement. As shown the disc 24 abutting the inner face of the valve-member 19 bears on the shoulder 33 defined by the portions 27, 28 of the stud or stem, affording support therefor. In order to guide the valve-member responsively to pressure exerted thereagainst, or from below, I have provided a cross-component or retainer 34 conveniently of the form shown to best advantage in Fig. 5. This retainer preferably consists of a metal stamping having its opposite ends curved at 35, a central aperture 36, Fig. 4, for free passage of the stem 28, and intervening reduced arms 37, said curved ends 35 snugly fitting diametrically into a machined step or annular-groove 38 in the underside of the valve seating member 9. The retainer 34 is normally held in the groove 38, by a spring 39 in compression between its underside and the headed-end 40 of the stem 28; but it may be readily removed and replaced by simply raising the valve member 19 and pulling the latter to one side, as shown in Fig. 4. In this operation one curved end 35 of said cross component or retainer 35 becomes disengaged from the groove 38, in the body of the valve seat member 9, and will slip out endwise through the bore 22 of said member 9, in an obvious manner. It is furthermore to be particularly noted that by firmly clamping the parts 19, 23 and 24 to the stem 27, 28 as hereinbefore set forth, such parts maintain their intended relation under the most exacting conditions of service without relative displacement. It will also be noted that without my improvements it would be necessary to cast a cross-piece in the valve seat member 9, which is difficult to machine and therefore increases the cost, while when so cast as an integral part it is liable to be rough and probably oversized, such factors tending to interfere with the free flow of fluid through the valve. On the other hand the blanked-out rigid piece 34 can be more easily and more cheaply produced to exact size and with smooth edges that offer a minimum of impedance to free flow of the fluid.

In Figs. 6, 7 and 8, all parts having equivalents in the preceding description are designated by like characters of reference to obviate unnecessary repetitive explanation. It is to be observed, however, that here the valve stem 28 is not provided with a head 40, but that said stem is furnished with a groove 41 into which is snapped or force-fitted a split-ring or collar 42, serviceable to retain the spring 39 in its active position, said split-ring or collar 42 having its relatively confronting ends 43 rounded, as shown, to facilitate its placement and removal, in an obvious manner.

While I have described preferred embodiments of the invention it is to be understood that adaptation of the valve assembly to other forms of lift valves is contemplated, hence the types specifically shown and explained are not conclusive. It is to be further understood that changes in the shape, size and arrangement, of the parts may be resorted to without departing from the spirit of my invention, or the scope of the following claims.

Having thus described my invention, I claim:

1. A check-assembly for valves including an annular seat member with an inner beveled edge and a spacedly related annular groove, said assembly comprising a centrally bored valve element having a tapered edge portion for coaction with the beveled seat; a headed-stem with a diametrically reduced extension to define a surrounding shoulder; means for securing the reduced extension of the stem rigidly in the central bore of the valve element; a retainer having a central aperture of a diameter to afford lateral movement thereof, relative to the longitudinal axis of the headed stem, and with its ends adapted for engagement in the annular groove of the seat member; and a spring on the stem in compression between the head thereof and the retainer element effective to hold the check-assembly in cooperative relation with the retainer ends engaged in the annular groove of the seat member but, when the check-assembly is drawn outwards, in opposition to the compressive spring and axially inclined said retainer ends are released from the annular groove, to thereby permit the check assembly to be withdrawn from out of engagement with the annular seat member, and vice versa.

2. The invention according to claim 1, wherein the apertured valve element is of hard-rubber interposed between outer and inner metallic reinforcing discs; wherein said inner disc bears against the shoulder of the stem; wherein the diametrically reduced outer end of said stem is screw-threaded for engagement by a clamp-nut having a concentric counter bore plugged with material effective to rigidly lock the parts aforesaid securely together.

3. The invention according to claim 1, wherein the retainer is in the form of a metal stamping having curved ends, for snug engagement in the annular seat groove of the seat member, and intervening relatively reduced arms that offer a minimum of impedance to free flow of fluid through the check-assembly.

4. The invention according to claim 1, wherein the stem head is formed by providing said stem with a groove proximate the end remote from the reduced extension; wherein a split-ring is force-fitted into said groove; and wherein the relatively confronting ends of said ring are rounded to facilitate its application to the stem.

RONALD M. WILSON.

REFERENCES CITED

The following references are of record in the file of this patent:

UNITED STATES PATENTS

| Number | Name | Date |
|---|---|---|
| 1,286,333 | Johnson | Dec. 3, 1918 |
| 1,297,312 | Barker | Mar. 18, 1919 |
| 1,811,166 | Yardley | June 23, 1931 |
| 1,818,439 | Travis | Aug. 11, 1931 |
| 1,828,697 | Yardley | Oct. 20, 1931 |
| 1,860,004 | Yardley | May 24, 1932 |
| 1,924,394 | Blank | Aug. 29, 1933 |
| 1,964,249 | Chase | June 26, 1934 |
| 2,005,954 | Petersen | June 25, 1935 |
| 2,063,821 | McKenzie | Dec. 8, 1936 |
| 2,207,285 | Chapman | July 9, 1940 |